US011186150B2

(12) United States Patent
Cao

(10) Patent No.: US 11,186,150 B2
(45) Date of Patent: Nov. 30, 2021

(54) LATCHING SYSTEMS FOR TONNEAU COVERS

(71) Applicant: Ningbo Scarman Auto Parts Co., Ltd., Cixi (CN)

(72) Inventor: Meiqin Cao, Cixi (CN)

(73) Assignee: NINGBO SCARMAN AUTO PARTS CO., LTD.

( * ) Notice: Subject to any disclaimer, the term of this patent is extended or adjusted under 35 U.S.C. 154(b) by 162 days.

(21) Appl. No.: 16/719,918

(22) Filed: Dec. 18, 2019

(65) Prior Publication Data

US 2021/0170846 A1    Jun. 10, 2021

(51) Int. Cl.
*B60J 7/10* (2006.01)
*B60J 7/14* (2006.01)
*B60J 7/185* (2006.01)

(52) U.S. Cl.
CPC ............... *B60J 7/104* (2013.01); *B60J 7/141* (2013.01); *B60J 7/185* (2013.01)

(58) Field of Classification Search
CPC ..... B60J 7/10; B60J 7/102; B60J 7/104; B60J 7/141; B60J 7/185; B60J 7/1858; B60J 7/198; B60J 7/1607; B60P 7/02; B60P 7/04
USPC ............ 296/100.04, 100.07, 100.16, 136.03
See application file for complete search history.

(56) References Cited

U.S. PATENT DOCUMENTS

| | | | |
|---|---|---|---|
| 6,340,194 B1* | 1/2002 | Muirhead | B60J 7/1621 296/100.01 |
| 8,146,982 B2* | 4/2012 | Williamson | B60J 7/104 296/100.16 |
| 10,232,691 B1* | 3/2019 | Weng | B60J 7/198 |
| 11,014,436 B1* | 5/2021 | Zheng | B60J 7/10 |
| 2006/0208524 A1* | 9/2006 | Brown | B60J 7/104 296/100.01 |
| 2006/0255616 A1* | 11/2006 | Malmberg | B60J 7/102 296/100.16 |
| 2010/0270824 A1* | 10/2010 | Yue | B60J 7/198 296/100.07 |
| 2011/0260493 A1* | 10/2011 | Xu | B60J 7/104 296/100.07 |
| 2012/0274091 A1* | 11/2012 | Yue | B60J 7/141 296/100.04 |
| 2015/0001877 A1* | 1/2015 | Fink | B60P 7/02 296/100.17 |
| 2015/0061315 A1* | 3/2015 | Facchinello | B60P 7/02 296/100.07 |
| 2016/0039274 A1* | 2/2016 | Smith | B60P 7/02 296/100.02 |
| 2016/0096421 A1* | 4/2016 | Facchinello | F16B 2/185 292/256 |
| 2019/0084388 A1* | 3/2019 | Zheng | B60J 7/042 |
| 2019/0315209 A1* | 10/2019 | Lewis | B60J 7/104 |
| 2020/0094660 A1* | 3/2020 | Ma | B60J 7/185 |

(Continued)

*Primary Examiner* — Gregory A Blankenship
(74) *Attorney, Agent, or Firm* — Kilpatrick Townsend & Stockton, LLP

(57) ABSTRACT

The present invention is directed a tonneau system. More specifically, embodiments of the present invention provide a tonneau system, which includes multiple frame bars interconnected by latches. At least one of latches includes a rod that is operably coupled to its main portion, which includes an opening to accommodate the rod. The rod attaches to a hook jaw that includes two openings for attaching to the truck frame. There are other embodiments as well.

18 Claims, 10 Drawing Sheets

(56) References Cited

U.S. PATENT DOCUMENTS

| 2020/0108702 A1* | 4/2020 | Dylweski, II | B60J 7/141 |
| 2020/0148046 A1* | 5/2020 | Ma | B60J 7/1607 |
| 2021/0016646 A1* | 1/2021 | Dylewski, II | B60J 7/141 |
| 2021/0170846 A1* | 6/2021 | Cao | B60J 7/141 |

* cited by examiner

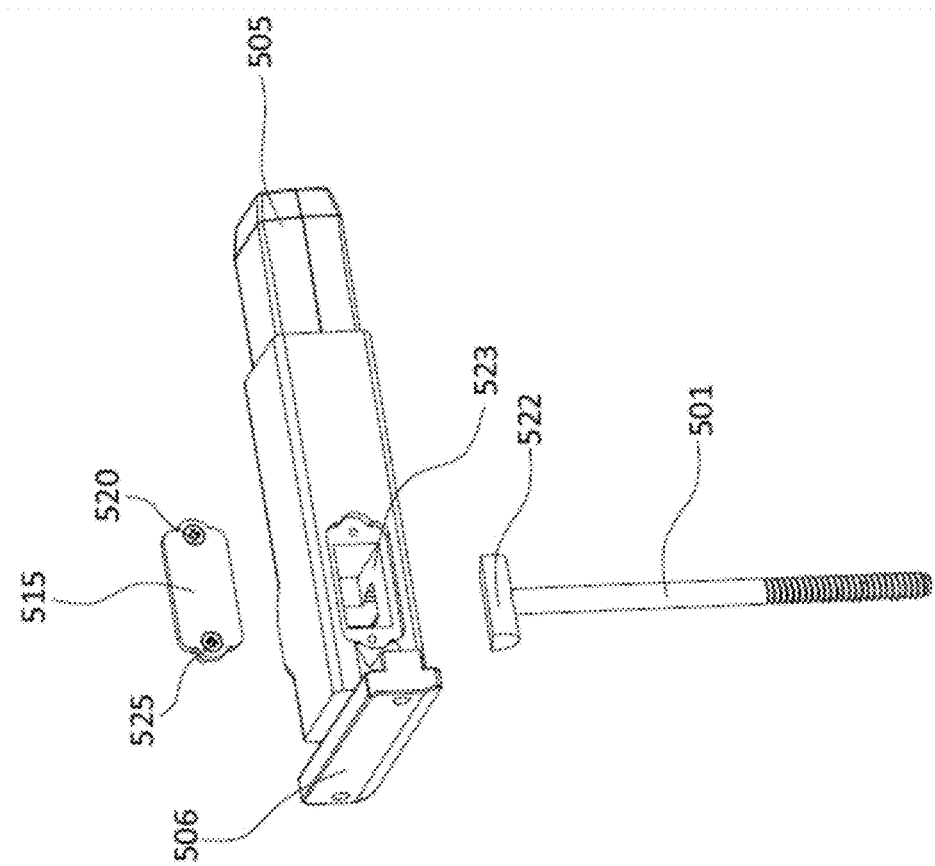

LATCHING SYSTEMS FOR TONNEAU COVERS

CROSS-REFERENCES TO RELATED APPLICATIONS

The present invention claims priority to Chinese Patent Application No. 201921849525.7, filed Dec. 10, 2019, entitled "A Fixed Structure of Vehicle Cover for Easy Storage", which is incorporated by reference in its entirety.

BACKGROUND OF THE INVENTION

Truck cover systems are often used to protect cargo beds of pickup trucks. Cover systems often cover all or a portion of the cargo bed such that any items stored and/or hauled in the cargo bed are protected from outside elements, as well as theft. In order to accommodate the storage and/or hauling of larger objects, as well as to facilitate easy loading and unloading of the cargo bed, many conventional cover systems are foldable into a storage position. This enables the cargo bed to be exposed without removing the cover entirely from the truck. However, this can cause visibility problems, as conventional cover systems block the view through the rear window of the pickup truck when the cover is in a folded position. Thus, driving may be unsafe while the cover system is folded for any reason. Additionally, when coupling multiple cover panels and/or hinges, seams are often formed such that water and other liquids may easily pass through and reach any cargo within the truck bed.

Over the past, with popularity of trucks, there have been many types of truck covers. Unfortunately, conventional truck covers have been inadequate. Improved truck cover systems are desired.

BRIEF SUMMARY OF THE INVENTION

The present invention is directed a tonneau system. More specifically, embodiments of the present invention provide a tonneau system, which includes multiple frame bars interconnected by latches. At least one of latches includes a rod that is operably coupled to its main portion, which includes an opening to accommodate the rod. The rod attaches to a hook jaw that includes two openings for attaching to the truck frame. There are other embodiments as well.

According to an embodiment, the present invention provides a latch device for a tonneau system. The device includes a tongue member. The device also includes a main portion directly attached to the tongue member. The main portion has of an opening and a cover. The device further includes a groove member directly attached to the main portion. The device also includes a rod including a semi-cylindrical portion and a threaded portion. The semi-cylindrical portion is configured within the opening and positioned behind the cover. The device further includes a hook jaw including a first opening and a second opening and a hole. A portion of the rod is configured within the hole. The device additionally includes a knob screwed onto the threaded portion of the rod.

According to another embodiment, the present invention provides a tonneau system, which includes a frame bar comprising a groove. The device also includes a cross bar configured substantially perpendicular relative to the frame bar. The cross bar includes a first opening. The latch device includes a tongue member inserted into the first opening. The latch device also includes a groove member configured inside the groove. The latch device further includes a main portion integrally attached to the tongue member and the groove member. The main portion has a second opening. The latch device also includes a rod comprising a semi-cylindrical portion and a threaded portion. The semi-cylindrical portion is positioned within the second opening. The latch device further includes a hook jaw including a first opening and a second opening. The latch device also includes a knob being screwed onto the threaded portion.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 5B is an alternative view of a latch according to embodiments of the present invention.

DETAILED DESCRIPTION OF THE INVENTION

The present invention is directed a tonneau system. More specifically, embodiments of the present invention provide a tonneau system, which includes multiple frame bars interconnected by latches. At least one of latches includes a rod that is operably coupled to its main portion, which includes an opening to accommodate the rod. The rod attaches to a hook jaw that includes two openings for attaching to the truck frame. There are other embodiments as well.

Figure 1:
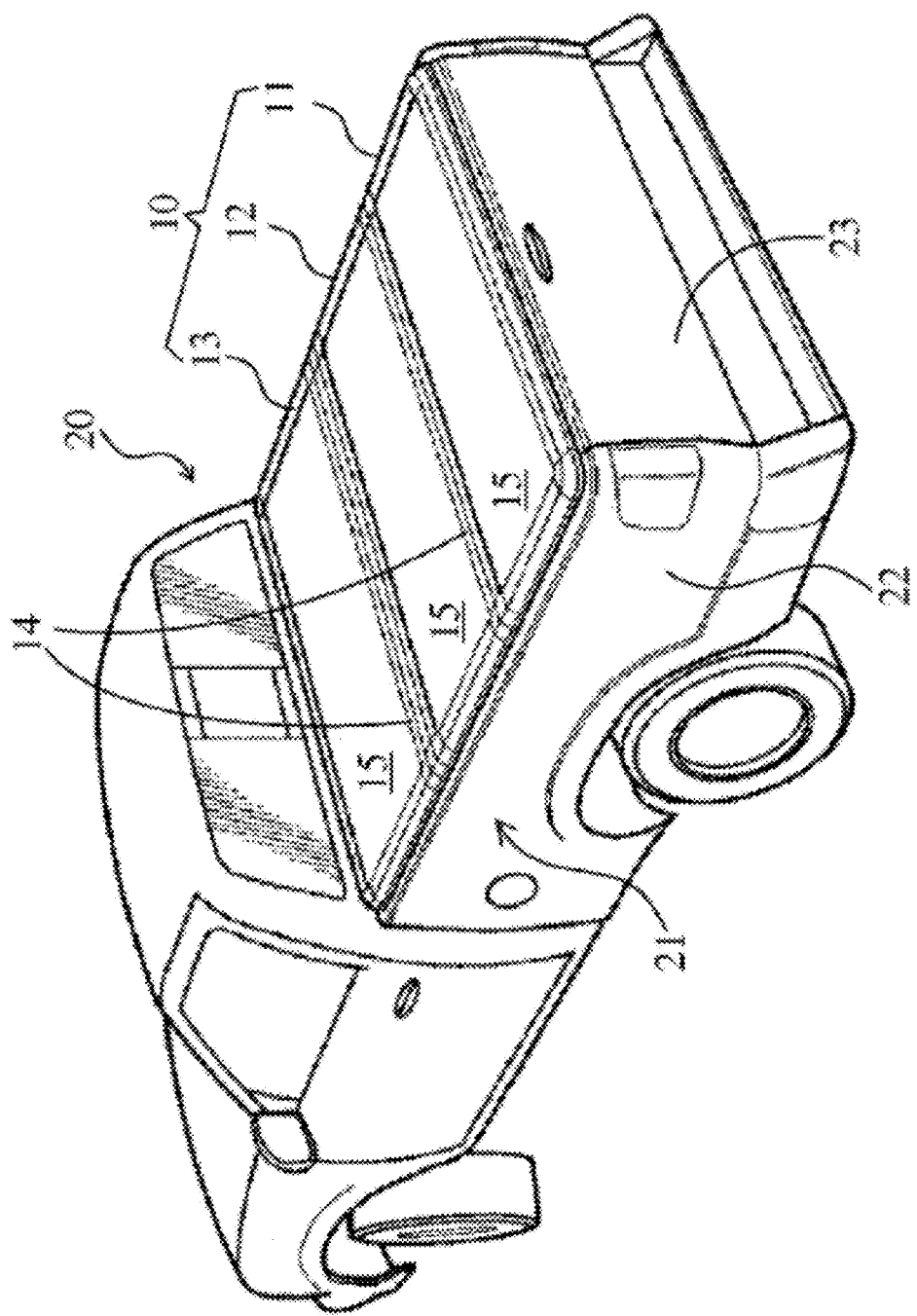
FIG. 1 is a simplified diagram illustrating a traditional foldable tonneau cover system for a pick-up truck.

As mentioned above, there are different types of truck covers, which are often referred to as tonneau covers. FIG. 1 is a simplified diagram illustrating a traditional foldable tonneau cover system for a pick-up truck. For example, latching systems according to embodiments of the present invention can be incorporated in the tonneau cover system illustrated in FIG. 1. The tonneau cover system 10 is used to cover a cargo box 21 of a pick-up truck 20. The tonneau cover system 10 includes a plurality of frame sections 11, 12, and 13, a plurality of hinges 14, a plurality of clamps (not-shown) and at least one cover portion 15, corresponding to that of the frame sections 11-13. The number of the frame sections 11-13, as implemented according to embodiments of the present invention, is two or more and foldable, thereby allowing for space saving and partially covered configurations. For example, the cover portion 15 is made of flexible or rigid material, and can be suitably fixed on the corresponding frame sections 11-13. Each of the frame sections 11 is constructed by a plurality of frame members. One of the frame sections 11 or 13 can be pivotally connected to another adjacent frame section 12 through two or more of the hinges 14, so that all of the frame sections 11-13 can be adjusted to an extended position or a storage position.

Figure 2:
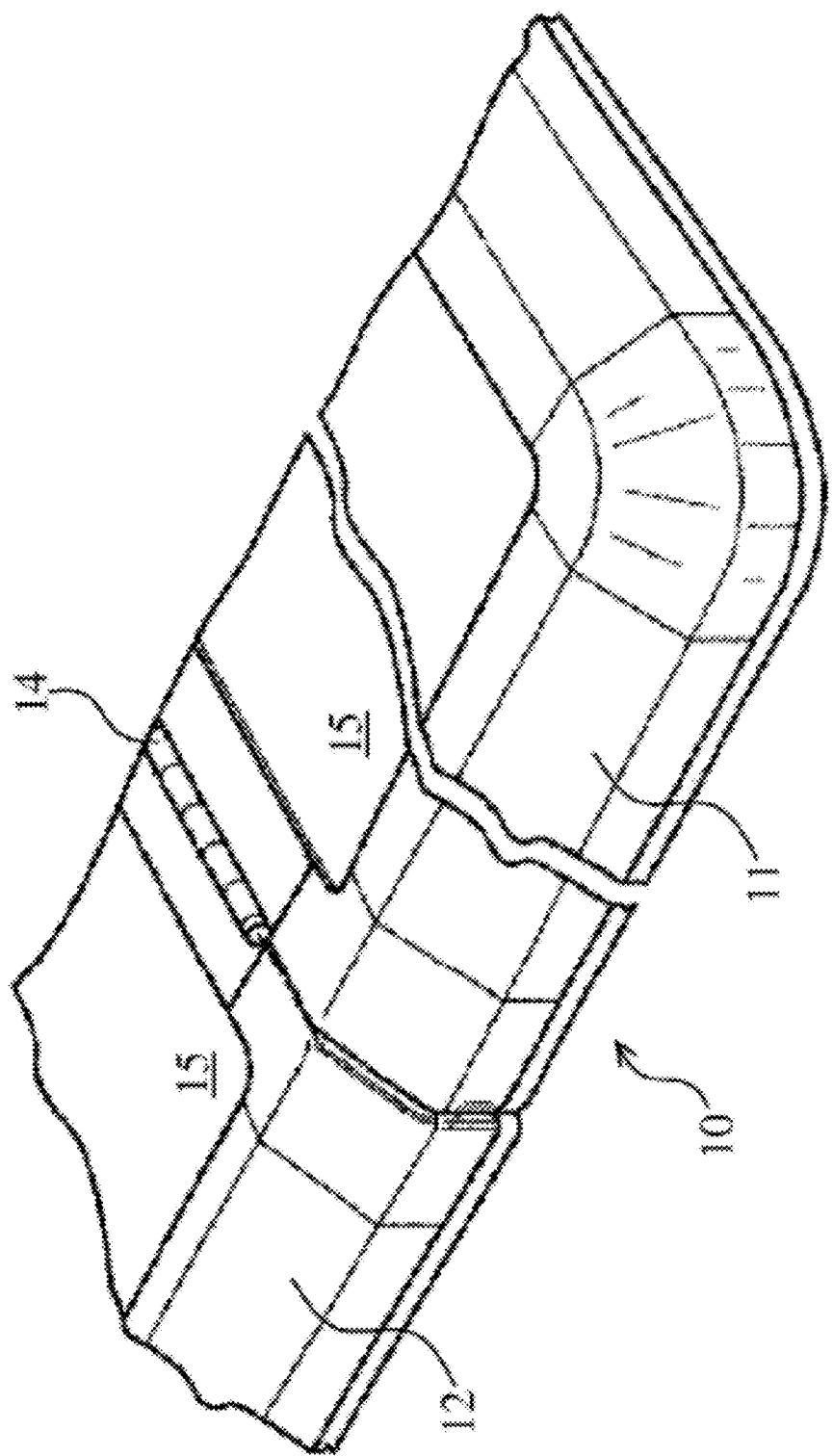
FIG. 2 is a simplified diagram illustrating a conventional tonneau cover.

FIG. 2 is a simplified diagram illustrating a conventional tonneau cover. When the frame sections 11 are in the extended position as shown, the frame sections 11-13 are horizontally extended on the two side walls 22 and a tailgate 23 of the cargo box 21, and fixed thereon by the clamps, so as to cover an inner space of the cargo box 21.

Depending on the implementation, there can be multiple hinges to pivotally connect the frame sections. As an example, hinges 14 mainly comprises two hinge portions and a pivot axis, wherein each of the hinge portions is installed on frame members of one of the frame sections 11-13, while the pivot axis is pivotally connected between the two hinge portions. When the frame sections 11 are in the extended position as shown in FIG. 2, the two sealing strips can be abutted against each other to provide a waterproof function for the frame sections 11-13. Furthermore, the external (or internal) side of each of the hinges 14 can be covered with another seal sheet (not-shown) to further enhance the waterproof function for the frame sections 11-13.

Tonneau cover system 10 includes multiple latches for attaching the system to the truck 20. Among other features, these latches need to be strong and secure to ensure that tonneau cover system 10 does not fall off. At the same time, latches include structural elements and mechanism that allows for a degree of adjustability. Additionally, latches allow for folding the tonneau cover system 10, where frame sections 11-13 could fold and stack up to save space and partially expose the truck bed.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 3:
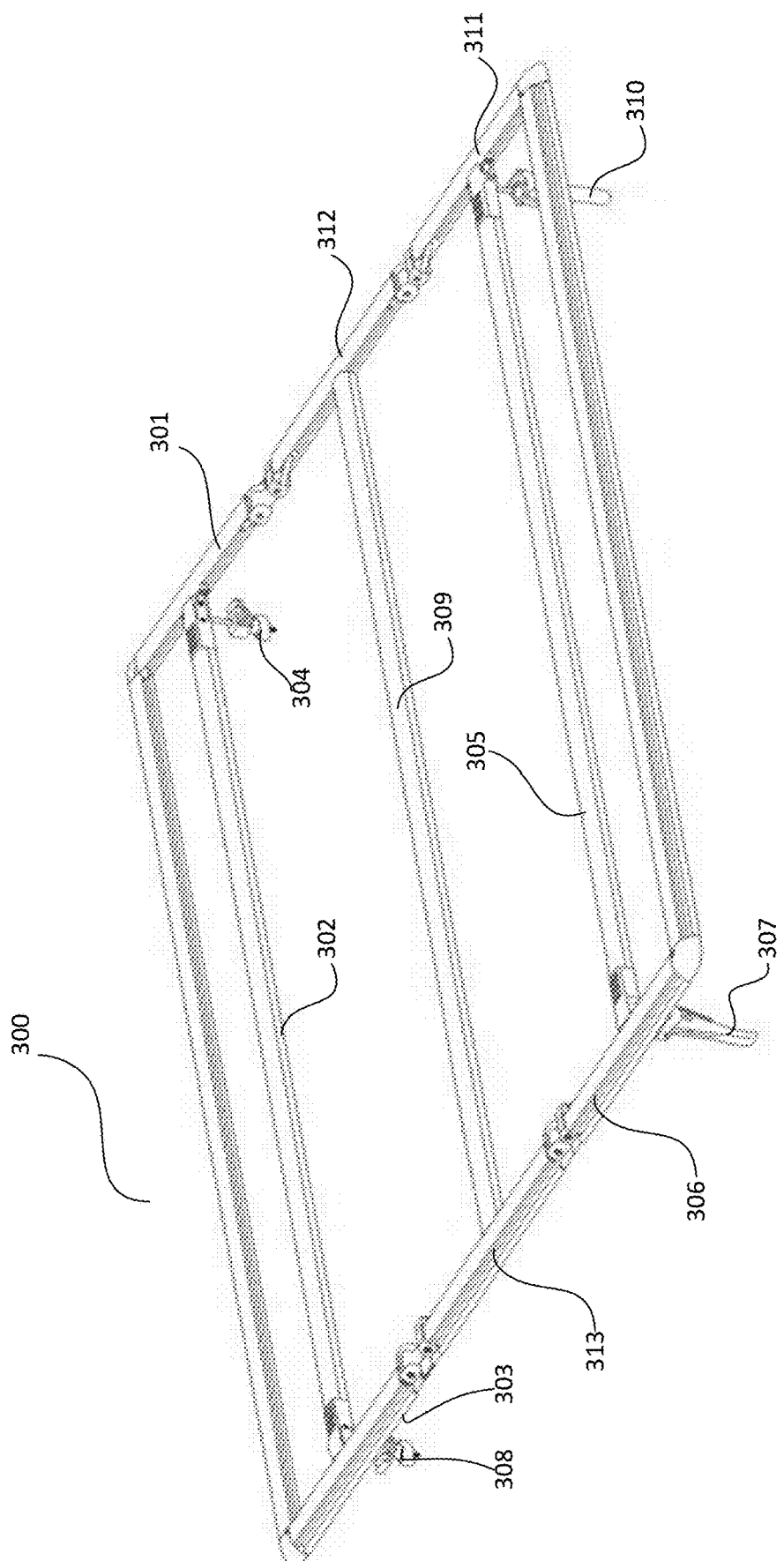
FIG. 3 is a simplified diagram illustrating a frame 300 of a tonneau cover system according to an embodiment of the present invention.

FIG. 3 is a simplified diagram illustrating a frame 300 of a tonneau cover system according to an embodiment of the present invention. This diagram is merely an example, which should not unduly limit the scope of the claims. One of ordinary skill in the art would recognize many variations, alternatives, and modifications. Frame 300 includes multiples sections. For example, frame bar 301 and frame bar 303 are parts of frame section 13 of the tonneau cover 10 illustrated in FIG. 1. Frame bar 301 and frame bar 303, when the tonneau cove in installed on a truck, mount over the frame of the truck cargo bed. Cross bar 302 is attached, by its laches (e.g., latch 304 and latch 308), to frame bar 301 and frame bar 303 to provide structural support. Additionally, latch 308 and latch 304 secures section frame section 13 to the cargo bed of truck. For example, a region of cargo bed frame is sandwiched, with adjustable force, between frame bar 301 and a hook jaw of latch 304. As explained below, latches 304 and 308 each include its adjustable hook jaws.

For example, frame bars 306 and 311 correspond to frame section 11 of the tonneau cover 10. Frame bars 306 and 311 as shown are connected to each cross bar 305. Latch 307 connects cross bar 305 to frame bar 307. Latch 310 connects cross bar 305 to frame bar 311. It is to be noted that while latch 304 performs similar function to that of latch 310, these two latches include different structures. Below its hook jaw, latch 304 includes a screwing knob that tightens the hook jaw against the truck frame. For latch 310, its hook jaw is tightened by a handle bar instead of a screwing knob. The difference between latches is because that latch 304 is for frame section 13, which is mounted on the cargo bed frame most of the time (unless tonneau system 10 is removed from the cargo bed). The screw knob of latch 304 provides adjustability of tightness. Latch 310, on the other hand, is configured for frame section 11, which is dismounted from the cargo bed frame when tonneau system 10 is in a folded position as described above. The handle bar of latch 310 allows for quick attachment to and detachment from the cargo bed frame.

For frame 300, cross bar 309 and frame bars 312-313 correspond to frame section 12 of the tonneau cover system 10. As shown, cross bar 309 is directly coupled to frame bars 312-313, without latches. It is to be understood that depending on the implementation, latches may be used to for section 12 as well.

Figure 4:
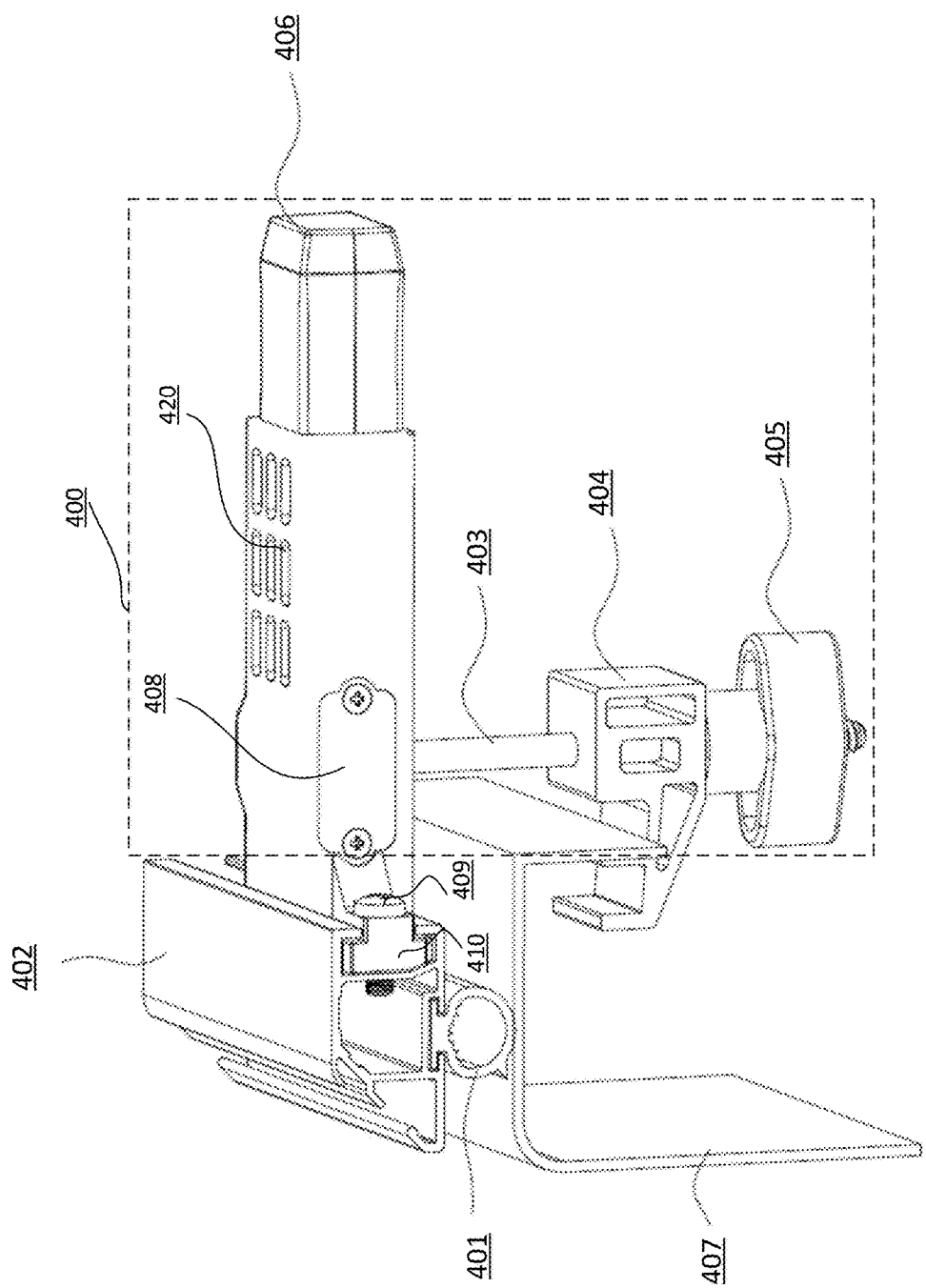
FIG. 4 is a simplified diagram illustrating a frame bar attached to a truck frame according to embodiments of the present invention.

FIG. 4 is a simplified diagram illustrating a frame bar attached to a truck frame according to embodiments of the present invention. This diagram is merely an example, which should not unduly limit the scope of the claims. One of ordinary skill in the art would recognize many variations, alternatives, and modifications. A latch 400 is coupled to frame bar 402 (only a portion of the frame bar is shown in FIG. 4). Frame bar 402 includes a buffer 401, which interfaces with truck frame 407. For example, buffer 401 comprises relatively sort and elastic material, such as rubber and/or various types of plastic. In various embodiments, buffer 401 is in a tubular shape and is hollow inside, and the hollow interior allows buffer 401 to deformed to a certain degree by the weight of the tonneau system. Additionally, buffer 401 provides water and dust sealing between the tonneau cover and the cargo bed. The surface of buffer 401 is specific configured to avoid damages (such as scratches) to the truck frame.

Latch 400 includes a tongue member 406 that inserts into a cross bar of a tonneau frame. For example, tongue member 406 can be disengageably inserted into cross bar 302 in FIG. 3. Depending on the implementation, tongue member 406 has a specific dimension for attaching to a cross bar. For example, tongue member 406 comprises plastic material while the cross bar is metal (e.g., aluminum, etc.). Latch 400 includes a groove member 410 that attaches to the frame bar 402 via a groove opening of truck frame 407. Additionally, screw 409 screws through groove member 410. For example, both the tongue member 406 and groove member 410 are parts of a main body 420. For example, main body 420 comprises plastic material and is fabricated using molding processes.

Rod 403 passes through hook jaw 404 and screws onto knob 405. By changing relative position between knob 405 and rod 403, the tightening of latch 400 against the frame bar 402 and truck frame 407. A portion of rod 403 is stored inside cover 408, and the rod 403 can rotate (e.g., pivotally) behind cover 408.

Figure 5A:
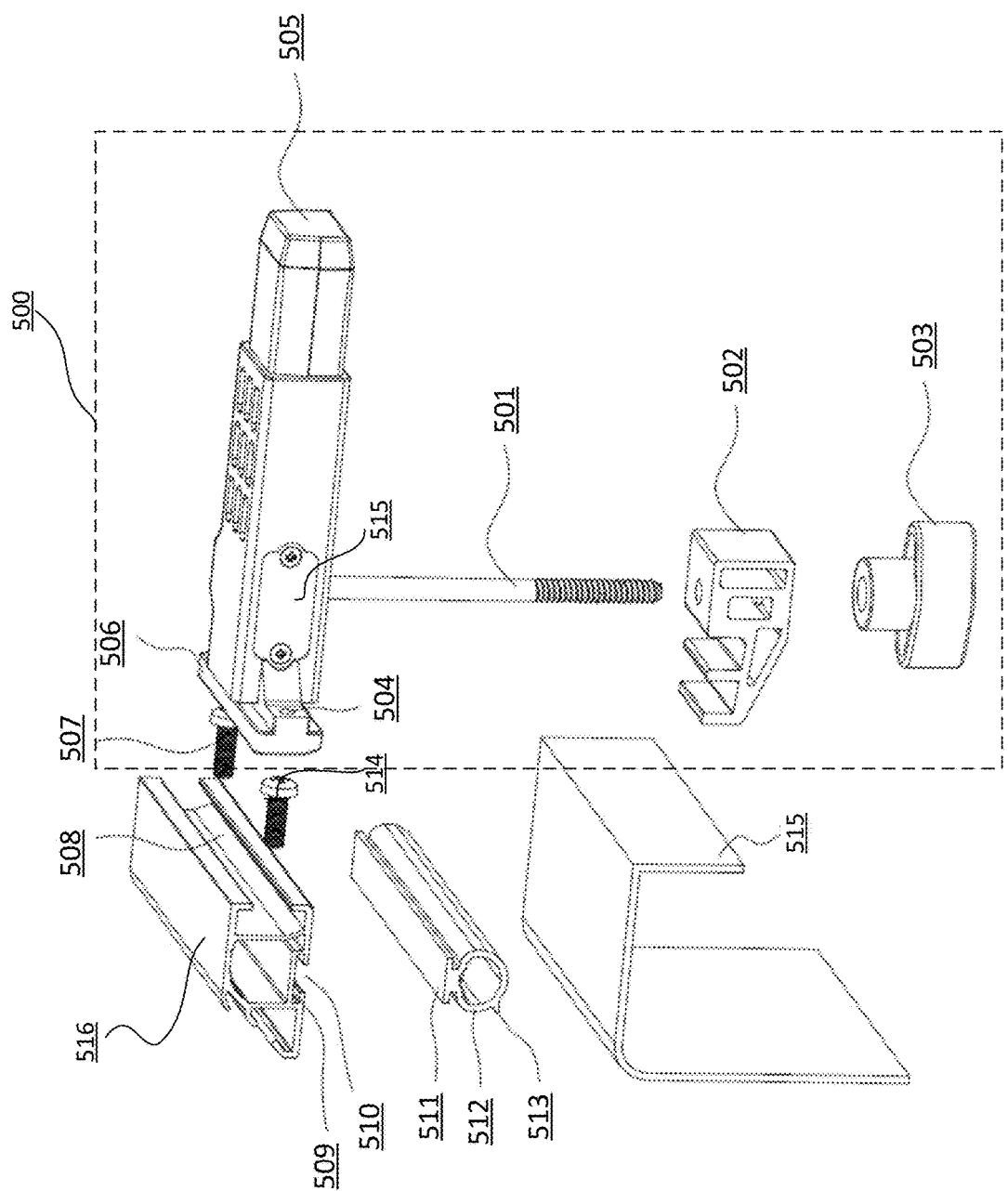
FIG. 5A is an exploded view of a latch according to embodiments of the present invention.

FIG. 5A is an exploded view of a latch according to embodiments of the present invention. This diagram is merely an example, which should not unduly limit the scope of the claims. One of ordinary skill in the art would recognize many variations, alternatives, and modifications. Latch 500 includes a tongue member 505. Latch 500 additionally includes groove member 506 that fits into groove 508 of frame bar 516. For example, the tongue member 505 and the groove member 506 are integral parts of a main body portion of the latch 500. In various implementations, when securing latches 500 to frame bar 516, screws 507 and 514 are screwed into frame bar 516. Frame bar 516 includes a slit 509, which accommodates a portion 511 of the buffer member 512. For example, buffer member 512 includes a notch 513 for water sealing. For example, buffer member 512 rests upon truck frame 515 when the tonneau system is mounted. Rod 501, as mentioned above, is partially stored behind cover 515. Rod 501 includes a threaded portion that passes through hook jaw 502 and screws onto knob 503. As shown, hook jaw 502 includes two openings for attaching to the truck frame at these two different locations. It is to be understood that knob 503 may be shaped as a handle bar, as shown in FIG. 3.

FIG. 5B is an alternative view of a latch according to embodiments of the present invention. This diagram is merely an example, which should not unduly limit the scope of the claims. One of ordinary skill in the art would recognize many variations, alternatives, and modifications. Behind cover 515, there is a space 523 to accommodate region 522 of rod 501. For example, once portion 522 of rod 501 is properly inserted into space 523, screws 525 and 520 secures cover 515, which prevents rod 501 from being removed from the latch. Additionally, cover 515 provides weather seal against water going inside space 523. As shown, portion 522 of rod 501 is substantially semi-cylindrical (top side being flat), which allows a certain degree of rotation within space 523. For example, the semi-cylindrical portion 522 is in direct contact with the surface of opening 523. It is to be appreciated that latch 500 includes only a single space for accommodating rod 501. In comparison, various conventional latch systems provide multiple spaces for accommodating rod 501, and configuration of the multiple openings undesirably weakens the latch and can lead to breakage.

Figure 5C:
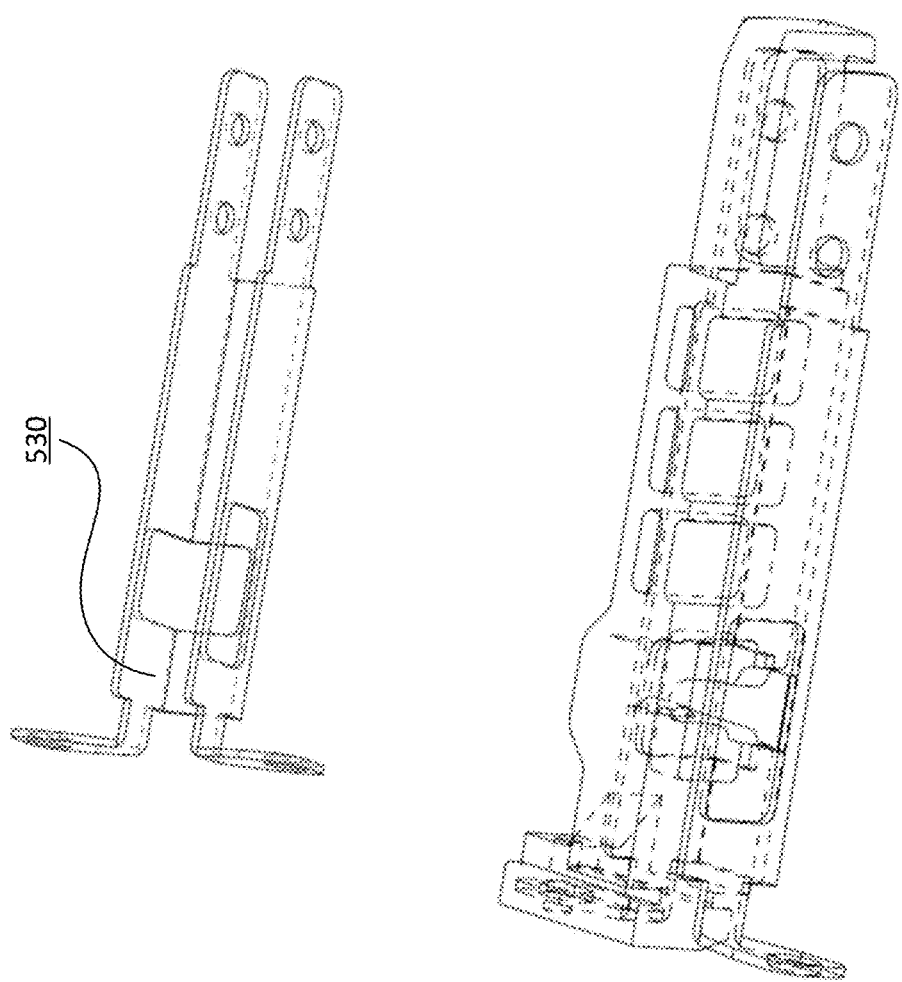
FIG. 5C is a simplified diagram illustrating a metal lining 530 configured within the main body portion of the latch 500.

FIG. 5C is a simplified diagram illustrating a metal lining 530 configured within the main body portion of the latch 500. This diagram is merely an example, which should not unduly limit the scope of the claims. One of ordinary skill in the art would recognize many variations, alternatives, and modifications. In various embodiments, the metal lining 530 comprises metal material such as aluminum, stainless steel, or other types of material. For example, the metal lining 530 is inserted inside the main body portion of the latch 500, and the main body portion encloses the metal lining 530 through an injection molding process.

Figure 5D:
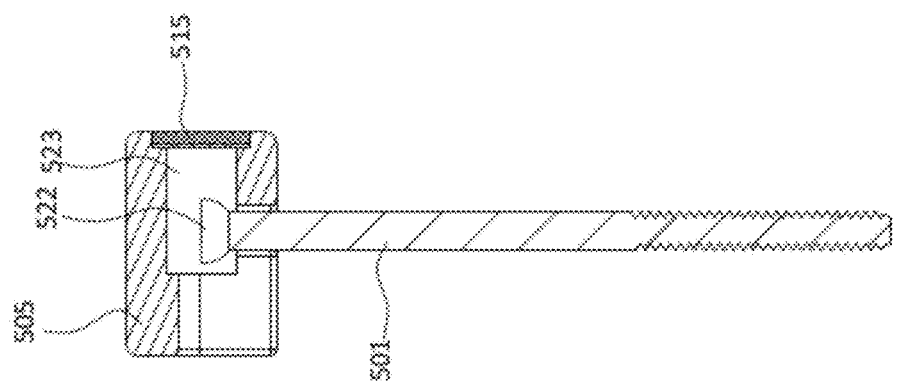
FIG. 5D is a simplified diagram illustrating a partial cross section view of latch 500 according to embodiments of the present invention.

FIG. 5D is a simplified diagram illustrating a partial cross section view of latch 500 according to embodiments of the present invention. This diagram is merely an example, which should not unduly limit the scope of the claims. One of ordinary skill in the art would recognize many variations, alternatives, and modifications. As shown in FIG. 5D, the semi-cylindrical portion of rod 501 is positioned inside opening 523. Opening 523 is covered and sealed by cover 515. As mentioned above, the semi-cylindrical shape of portion 522 allows rod 501 to rotate as needed during various options (e.g., attaching and detaching the latch from the truck frame).

Figure 5E:
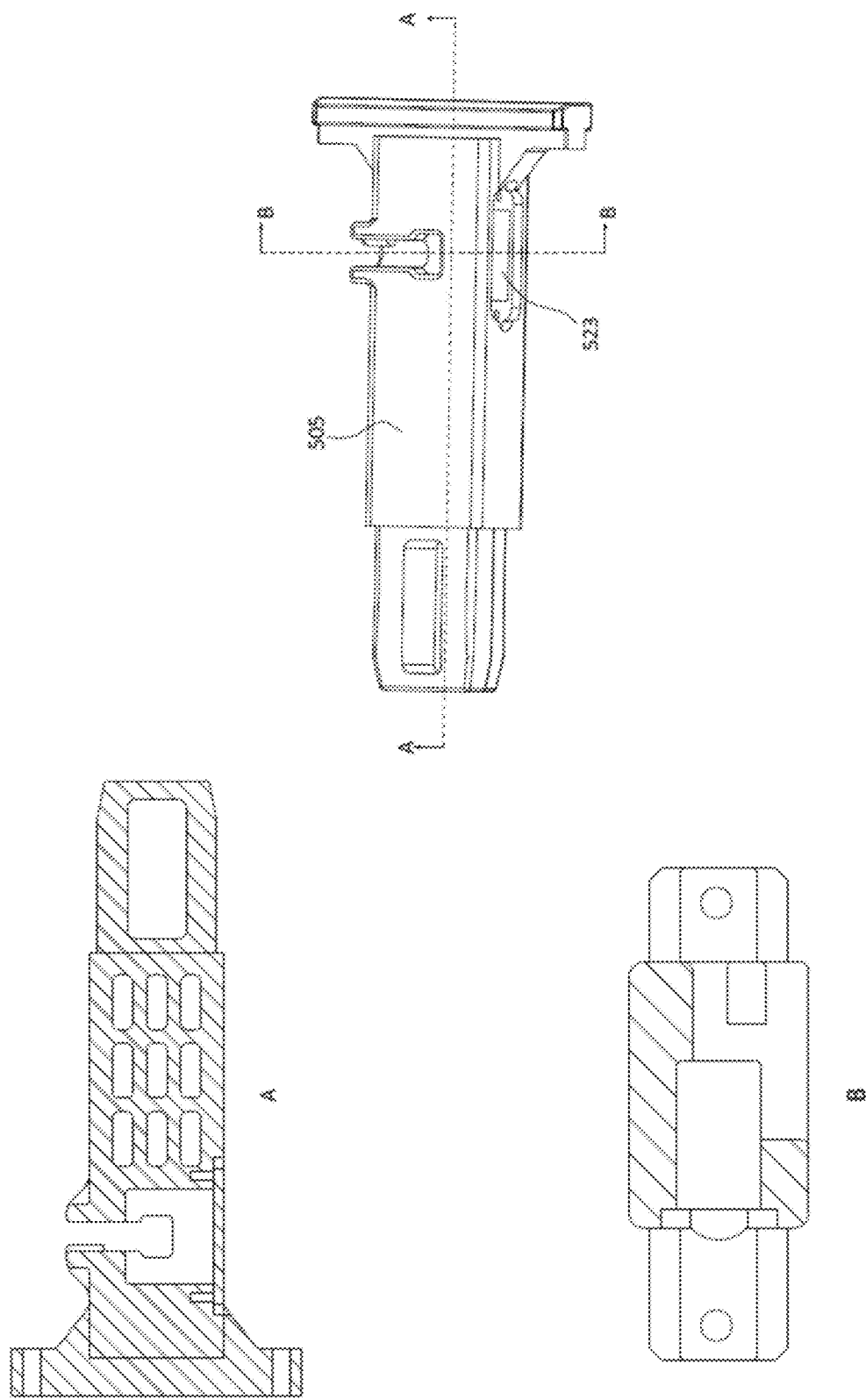
FIG. 5E provide diagrams illustrating different side views of the main portion of latch 500 according to embodiments of the present invention.

FIG. 5E provide diagrams illustrating different side views of the main portion of latch 500 according to embodiments of the present invention. This diagram is merely an example, which should not unduly limit the scope of the claims. One of ordinary skill in the art would recognize many variations, alternatives, and modifications.

Figure 6:
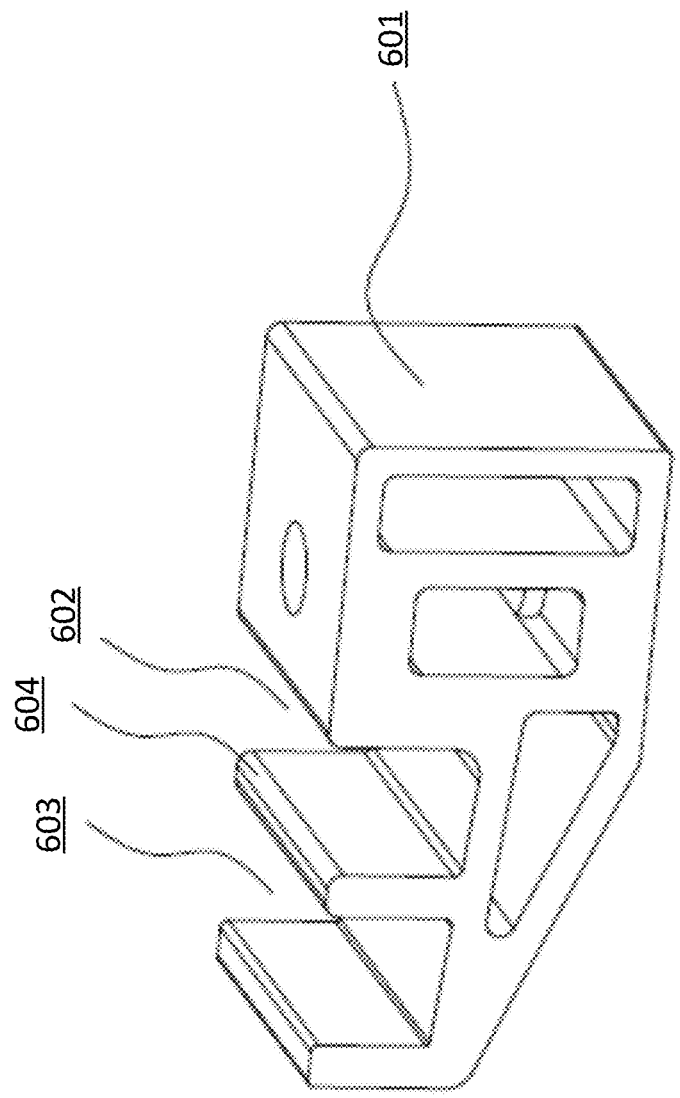
FIG. 6 is a simplified diagram illustrating a hook jaw 601 according to embodiments of the present invention.

FIG. 6 is a simplified diagram illustrating a hook jaw 601 according to embodiments of the present invention. This diagram is merely an example, which should not unduly limit the scope of the claims. One of ordinary skill in the art would recognize many variations, alternatives, and modifications.

For example, hook jaw 601 comprises metal material, such aluminum, copper, magnesium, steel, and alloys thereof. Hook jaw 601 includes openings 602 and 603 for attaching to a truck frame. It is to be appreciated that openings 602 and 603 can withstand a large amount of force when the tonneau is attached to a truck. In a specific embodiment, opening 602 can secure (without deformity) over 7000N of force, and opening 603 can secure over 6000N of force, and the strength of hook jaw 601 allows tonneau system to be securely installed on a truck frame.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A latch device for a tonneau system, the device comprising:
   a tongue member;
   a main portion directly attached to the tongue member, the main portion consisting of an opening and a cover;
   a groove member directly attached to the main portion;
   a rod including a semi-cylindrical portion and a threaded portion, the semi-cylindrical portion being configured within the opening and positioned behind the cover;
   a hook jaw including a first hook opening and a second hook opening and a hole, a portion of the rod being configured within the hole; and
   a knob screwed onto the threaded portion of the rod.

2. The device of claim 1 wherein the tongue member is integrally attached to the main portion.

3. The device of claim 1 wherein the groove member is integrally attached to the main portion.

4. The device of claim 1 wherein the groove member is shaped to fit a groove of a frame bar.

5. The device of claim 1 wherein the hook jaw comprises aluminum or steel material.

6. The device of claim 1 wherein the first hook opening is capable of withstanding at least 7000N.

7. The device of claim 1 wherein the second hook opening is capable of withstanding at least 5000N.

8. A tonneau system comprising:
   a frame bar comprising a groove;
   a cross bar configured substantially perpendicular relative to the frame bar, the cross bar comprising a first opening;
   a latch device comprises:
      a tongue member inserted into the first opening;
      a groove member configured inside the groove;
      a main portion integrally attached to the tongue member and the groove member, the main portion comprising a second opening;
      a rod comprising a semi-cylindrical portion and a threaded portion, the semi-cylindrical portion being positioned within the second opening;
      a hook jaw including a first opening and a second opening; and
      a knob being screwed onto the threaded portion.

9. The system of claim 8 wherein the tongue member is non-metal.

10. The system of claim 8 further comprising a buffer attached to the frame bar.

11. The system of claim 10 wherein the buffer provides a water seal.

12. The system of claim 10 wherein the buffer comprises rubber material.

13. A tonneau system comprising:
   a frame bar comprising a groove and a buffer;
   a cross bar comprising a first opening;
   a latch device comprises:
      a tongue member inserted into the first opening;
      a groove member configured inside the groove;
      a main portion integrally attached to the tongue member and the groove member, the main portion comprising a second opening;
      a rod comprising a semi-cylindrical portion and a threaded portion, the semi-cylindrical portion being positioned within the second opening;
      a hook jaw including a first opening and a second opening; and
      a knob being screwed onto the threaded portion.

14. The system of claim 13 wherein the first opening is attachable to a truck frame.

15. The system of claim 13 wherein the first opening is capable of withstanding at least 7000N.

16. A tonneau system comprising:
   a frame bar comprising a side groove and a bottom grove;
   a buffer coupled to the frame bar via the bottom groove, the buffer comprises a weather seal strip;
   a cross bar comprising a first opening;
   a latch device comprises:
      a tongue member inserted into the first opening;
      a groove member configured inside the groove;
      a main portion integrally attached to the tongue member and the groove member, the groove member being coupled to the side groove of the frame bar, the main portion comprising a second opening;
      a rod comprising a semi-cylindrical portion and a threaded portion, the semi-cylindrical portion being positioned within the second opening;
      a hook jaw including a first opening and a second opening; and
      a knob being screwed onto the threaded portion.

17. The system of claim 16 wherein the hook jaw further comprises a third opening.

18. The system of claim 16 wherein the main portion further comprises a cover enclosing the second opening.

* * * * *